United States Patent
Lee et al.

(10) Patent No.: US 11,096,215 B2
(45) Date of Patent: Aug. 17, 2021

(54) METHOD AND APPARATUS FOR TRANSMITTING DATA IN WIRELESS COMMUNICATION SYSTEM

(71) Applicant: Samsung Electronics Co., Ltd., Suwon-si (KR)

(72) Inventors: Jeongho Lee, Suwon-si (KR); Seungjoo Maeng, Seongnam-si (KR); Youngsung Kho, Seongnam-si (KR); Hanseok Kim, Seoul (KR); Kyuho Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/756,678

(22) PCT Filed: Sep. 2, 2016

(86) PCT No.: PCT/KR2016/009843
§ 371 (c)(1),
(2) Date: Mar. 1, 2018

(87) PCT Pub. No.: WO2017/039381
PCT Pub. Date: Mar. 9, 2017

(65) Prior Publication Data
US 2018/0255577 A1  Sep. 6, 2018

(30) Foreign Application Priority Data
Sep. 4, 2015 (KR) .......................... 10-2015-0125837

(51) Int. Cl.
*H04W 74/08* (2009.01)
*H04W 28/26* (2009.01)
(Continued)

(52) U.S. Cl.
CPC ....... *H04W 74/0808* (2013.01); *H04W 16/14* (2013.01); *H04W 28/26* (2013.01);
(Continued)

(58) Field of Classification Search
CPC . H04W 74/0808; H04W 74/08; H04W 74/00; H04W 74/002; H04W 72/0453; H04W 72/04; H04W 16/14; H04W 28/26
See application file for complete search history.

(56) References Cited

U.S. PATENT DOCUMENTS

2014/0112289 A1  4/2014  Kim et al.
2014/0248901 A1  9/2014  Johnsson et al.
(Continued)

FOREIGN PATENT DOCUMENTS

CN  104822149 A  8/2015
GB  2495608 A  4/2013
(Continued)

OTHER PUBLICATIONS

Extended European Search Report dated Jul. 23, 2018; European Appln No. 16842347.3-1215/3346793.
(Continued)

*Primary Examiner* — Hassan Kizou
(74) *Attorney, Agent, or Firm* — Jefferson IP Law, LLP (57) ABSTRACT

The present disclosure provides methods and apparatuses for transmitting data, by a base station, in an unlicensed frequency. A method according to a representative embodiment includes: transmitting a first signal for determining whether a data transmission is possible in an unlicensed frequency band; transmitting a second signal for reserving a data transmission in the unlicensed frequency band when the data transmission in the unlicensed frequency band is possible; and transmitting first data to a terminal through the unlicensed frequency band after transmitting the second signal.

(Continued)

In an aspect, the base station determines whether other communication devices do not use the unlicensed frequency band, and transmits a channel reservation signal having a period shorter than a resource allocation period during a predetermined period of time, thereby pursuing coexistence with other communication devices and improving the performance of a communication system at the same time.

16 Claims, 10 Drawing Sheets

(51) Int. Cl.
*H04W 74/00* (2009.01)
*H04W 72/04* (2009.01)
*H04W 16/14* (2009.01)

(52) U.S. Cl.
CPC ....... *H04W 72/04* (2013.01); *H04W 72/0453* (2013.01); *H04W 74/00* (2013.01); *H04W 74/08* (2013.01); *H04W 74/002* (2013.01)

(56) References Cited

U.S. PATENT DOCUMENTS

| | | | |
|---|---|---|---|
| 2014/0341018 A1 | 11/2014 | Bhushan et al. | |
| 2014/0341207 A1 | 11/2014 | Bhushan et al. | |
| 2015/0049741 A1 | 2/2015 | Chen et al. | |
| 2015/0146680 A1 | 5/2015 | Luo et al. | |
| 2015/0250002 A1* | 9/2015 | Sun | H04W 74/0808 370/329 |
| 2015/0280871 A1* | 10/2015 | Xu | H04W 72/0446 370/330 |
| 2016/0174109 A1* | 6/2016 | Yerramalli | H04W 28/26 370/329 |
| 2016/0227578 A1* | 8/2016 | Lee | H04W 74/004 |
| 2016/0295611 A1* | 10/2016 | Yin | H04L 5/00 |
| 2018/0027418 A1* | 1/2018 | Li | H04W 16/14 370/329 |

FOREIGN PATENT DOCUMENTS

| | | |
|---|---|---|
| WO | 2013/006006 A2 | 1/2013 |
| WO | 2015/076938 A1 | 5/2015 |
| WO | 2015/103632 A1 | 7/2015 |

OTHER PUBLICATIONS

3GPP; TSGRAN; Study on Licensed-Assisted Access to Unlicensed Spectrum; (Release 13)', 3GPP TR 36.889 V13.0.0, Jun. 18, 2015 Section 7.2.1.1, 7.2.1.6.

Chinese Office Action dated Dec. 3, 2020, issued in Chinese Application No. 201680051326.4.

LG Electronics: "DL/UL solutions of LAA with LBT", 3GPP Draft; R1-150214 LAA LBT Proposal, 3RD Generation Partnership Project (3GPP), Mobile Competence Centre; 650, Route Des Lucioles; F-06921 Sophia-Anti Polis Cedex; France vol. Ran WG1, no. Athens, Greece; Feb, 9, 2015-Feb. 13, 2015 Feb. 8, 2015 (Feb. 8, 2015), XP050933428, Retrieved from the Internet: URL: http://www.3gpp.org/ftp/Meetings_3GPP_SYNC/RAN1/Docs/[retrieved on Feb. 8, 2015].

European Office Action dated Apr. 7, 2021, in European Application No. 16842347.3.

* cited by examiner

METHOD AND APPARATUS FOR TRANSMITTING DATA IN WIRELESS COMMUNICATION SYSTEM

CROSS-REFERENCE TO RELATED APPLICATION(S)

This application is a U.S. National Stage application under 35 U.S.C. § 371 of an International application number PCT/KR2016/009843, filed on Sep. 2, 2016, which is based on and claimed priority of a Korean patent application number 10-2015-0125837, filed on Sep. 4, 2015, in the Korean Intellectual Property Office, the disclosure of which is incorporated by reference herein in its entirety.

TECHNICAL FIELD

The present invention relates to a method and apparatus for transmitting data in a mobile communication system and, in particular, to a method and apparatus of a base station for transmitting data in an unlicensed frequency.

BACKGROUND ART

Mobile communication systems were developed to provide subscribers with voice communication services on the move. Recently, mobile communication systems have evolved to the level of supporting high speed data communication services beyond the early voice-oriented services. However, the resource shortage and user requirements for higher speed services are spurring evolution towards increasingly more advanced mobile communication systems.

Meanwhile, unlike voice services, data services are provided using the resources determined based on transmit data amount and channel condition. Accordingly, a wireless communication system, particularly a cellular communication system, is provided with a scheduler, which takes charge of resource allocation in consideration of the required resource amount, channel condition, data amount, etc. Typically, in most cellular communication systems, the scheduler is located in base stations for radio resource management, and this is the case even in the Long-Term Evolution (LTE) system as one of the next generation mobile communication systems.

In an LTE system operating on a licensed band frequency, the frequency owner may use the frequency resources exclusively in the way as intended. In the case of the communication devices operating in an unlicensed band, however, they have to operate on a frequency channel; thus, there is a need of a method for sharing the channel without collision. Listen Before Talk (LBT) is a technique for sensing a radio channel and, if the channel is not in use, starting transmission.

An LBT scheme may be performed in such a way of performing clear channel assessment (CCA) on a channel to determine whether the channel is occupied by another communication technology device and, if the channel is sensed idle, allowing transmission of signals. A CCA period may be set to 20 us or more, 18 us, or 9 us depending on the type of LBT and radio communication technology and, in the case of using extended CCA (eCCA), the corresponding observation time is repeated N times (random factor). Typically, the channel occupancy is limited to a maximum channel occupancy time, even when the channel is sensed idle through CCA, because one device is not permitted to occupy the channel too much.

Figure 1:
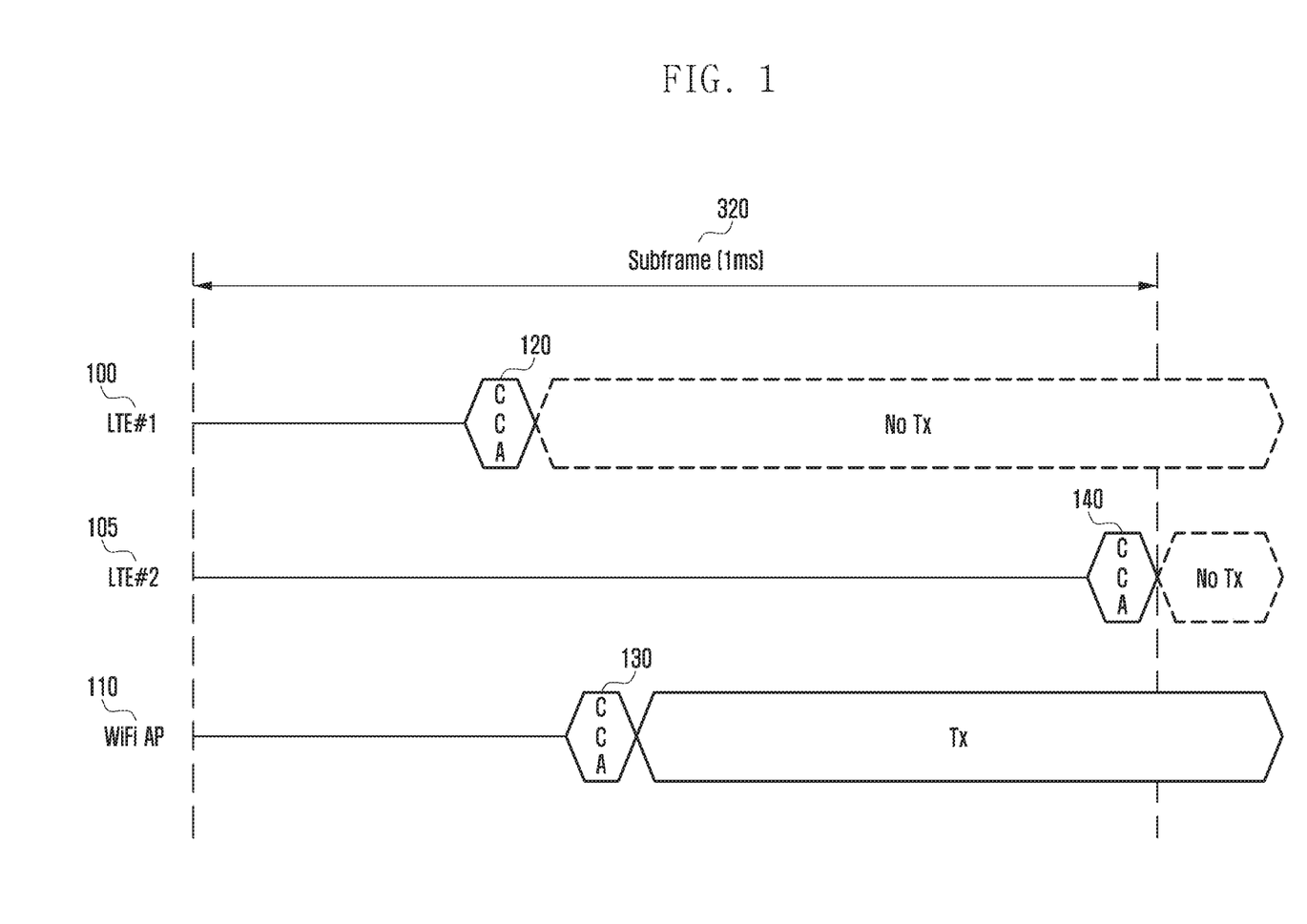
FIG. 1 is a diagram for explaining a problem that occurs when communicating data in a LTE communication system that uses an unlicensed band frequency channel.

FIG. 1 is a diagram for explaining a problem that occurs when communicating data in an LTE communication system that uses an unlicensed band frequency channel.

In detail, FIG. 1 depicts an exemplary problem occurring at an evolved Node B (eNB) when the LTE communication system adopts the aforementioned LBT scheme for use of an unlicensed frequency.

In the case of using an LBT scheme in an LTE communication system, even when the channel is sensed as idle through CCA 120 of about 20 µs, the eNB has to wait until the next resource allocation period arrives because the resource allocation of the eNB is performed on a per subframe basis. In this case, while the eNB is waiting for the next subframe, another communication technology device, e.g., a wireless-fidelity (Wi-Fi) device 110, may perform CCA 130 of about 9 µs and preoccupy the corresponding channel. That is, the LTE communication system with a resource allocation period longer than that of other communication systems has a relatively low channel occupancy rate on an unlicensed frequency, resulting in user service quality degradation.

DISCLOSURE OF INVENTION

Technical Problem

The present invention has been conceived to solve the above problem and aims to provide a method for increasing channel occupancy rate of an eNB on an unlicensed frequency channel by transmitting a channel reservation signal at an interval shorter than the resource allocation period after sensing that the channel is idle through channel assessment for sharing the channel with other communication technology devices.

Solution to Problem

In accordance with an aspect of the present invention, a data transmission method of a base station in a wireless communication system includes transmitting a first signal for determining whether to transmit a data in an unlicensed frequency band; transmitting, when the data in the unlicensed frequency band is determined, a second signal for reserving the unlicensed frequency band for transmitting data; and transmitting first data to a terminal in the unlicensed frequency band.

In accordance with another aspect of the present invention, a base station for transmitting data in a wireless communication system includes a transceiver configured to transmit and receive data and a controller configured to control the transceiver to transmit a first signal for determining whether to transmit a data in an unlicensed frequency band; transmit, when transmitting the data in the unlicensed frequency band is determined, a second signal for reserving the unlicensed frequency band for transmitting data; and transmit first data to a terminal in the unlicensed frequency band.

Advantageous Effects of Invention

The data transmission method and apparatus of the present invention is advantageous in terms of improving system throughput on an unlicensed frequency while sharing the unlicensed frequency with different communication technology devices in such a way of transmitting, at an eNB, a channel reservation signal at an interval shorter than a predetermined resource allocation period upon sensing the idleness of the unlicensed frequency.

MODE FOR THE INVENTION

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make the subject matter of the present invention clear.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Figure 2:
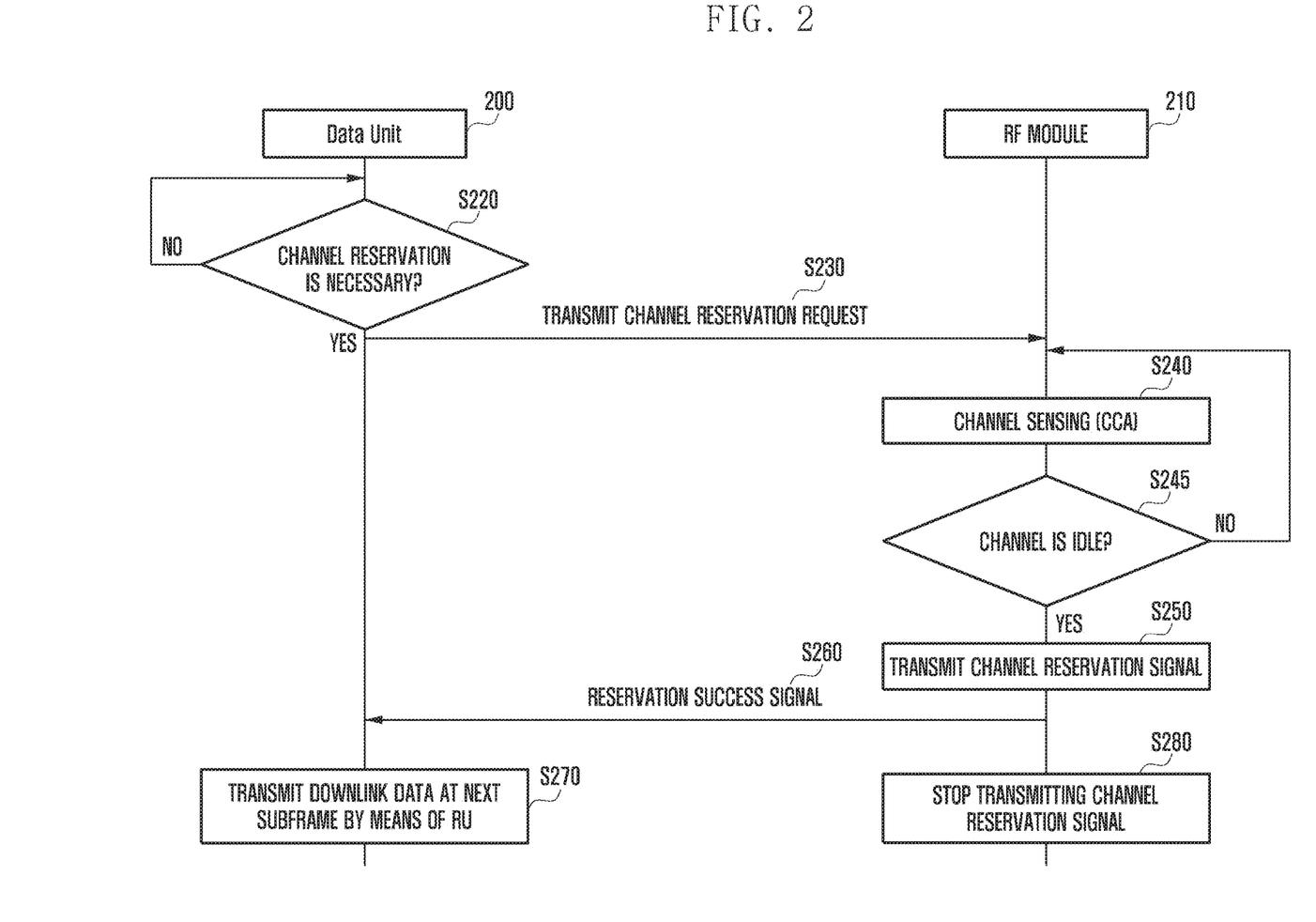
FIG. 2 is a flowchart illustrating a channel reservation signal transmission operation of a base station for data transmission on an unlicensed frequency channel according to an embodiment of the present invention.

FIG. 2 is a flowchart illustrating a channel reservation signal transmission operation of a base station for data transmission on an unlicensed frequency channel according to an embodiment of the present invention.

In detail, FIG. 2 is a diagram for explaining operations between a data unit (DU) 200 and a radio frequency (RF)

module 210 in the base station. The base station may be equivalent to an eNB of an LTE system and a NodeB of a wideband code division multiple access (WCDMA) system. Although the description is made with particular reference to the LTE eNB for convenience of explanation, the terms "base station" and "eNB" may be used interchangeably hereinafter.

The DU 200 is a digital signal processing unit of the eNB that is responsible for encoding and decoding digital signals. The DU 200 may encode a signal to be transmitted to the UE and send the encoded signal to a radio unit (RU). The RU, as a radio signal processing unit of the eNB, includes a converter for converting the digital signal received from the DU 200 to an RF signal of a frequency band and sending the RF signal to an antenna and an RF amplifier for amplifying the RF signal.

In the case that the base station is an eNB of an LTE communication system, the RU of the eNB may transmit the RF signal to the UE based on a resource allocation period, i.e., scheduling period. The RU transmits the RF signal to the UE at an interval of 1 ms because the resource allocation unit of the LTE communication system is a subframe (1 ms). Accordingly, in order to transmit a channel reservation signal at an interval shorter than one subframe, it is necessary for the eNB to have an RF module 210 for a different communication technology. The RF module 210 may transmit a signal at an interval shorter than the resource allocation period of the LTE communication system, e.g., Wi-Fi beacon frame.

The DU 200 may determine at step S220 whether a channel reservation is necessary. That is, the DU 200 may determine presence/absence of data to transmit to the corresponding terminal to determine whether the channel reservation is necessary. If there is no data to transmit and thus no channel reservation is necessary, the DU 200 may repeat the determination operation at a predetermined interval.

If the DU 200 detects the presence of data to transmit and the necessity of channel reservation, it may send a channel reservation request to the RF module 210 at step S230. The RF module 210 may perform channel sensing through CCA on the unlicensed frequency channel at step S240. Next, the RF module 210 may determine at step S245 whether the channel is idle. That is, the RF module 210 may determine whether the unlicensed frequency channel for use in transmitting the data is occupied by another communication technology device. If it is determined that the channel is idle, the RF module 210 may transmit a channel reservation signal at step S250. Examples of the channel reservation signal may be the aforementioned Wi-Fi beacon frame. The channel reservation signal may be transmitted periodically in order for other communication devices to sense that the channel is busy during their CCA and thus to not preoccupy the channel.

After transmitting the channel reservation signal, the RF module 210 may send a reservation success signal to the DU 200 at step S260. If the reservation success signal is received, the DU 200 may transmit downlink data to the terminal in the next resource allocation period at step S270. That is, the RU may transmit the downlink data to the terminal at the start time of the next subframe or symbol. Although not shown in the drawing, if the resource allocation is performed in unit of a symbol, the DU 200 may transmit the downlink data to the terminal at the next symbol. After transmitting the reservation success signal, the RF module 210 may stop transmitting the channel reservation signal in the next resource allocation period at step S280. That is, the DU 200 may stop transmitting the channel reservation signal at the start time of the next subframe as the next resource allocation period.

Figure 3:
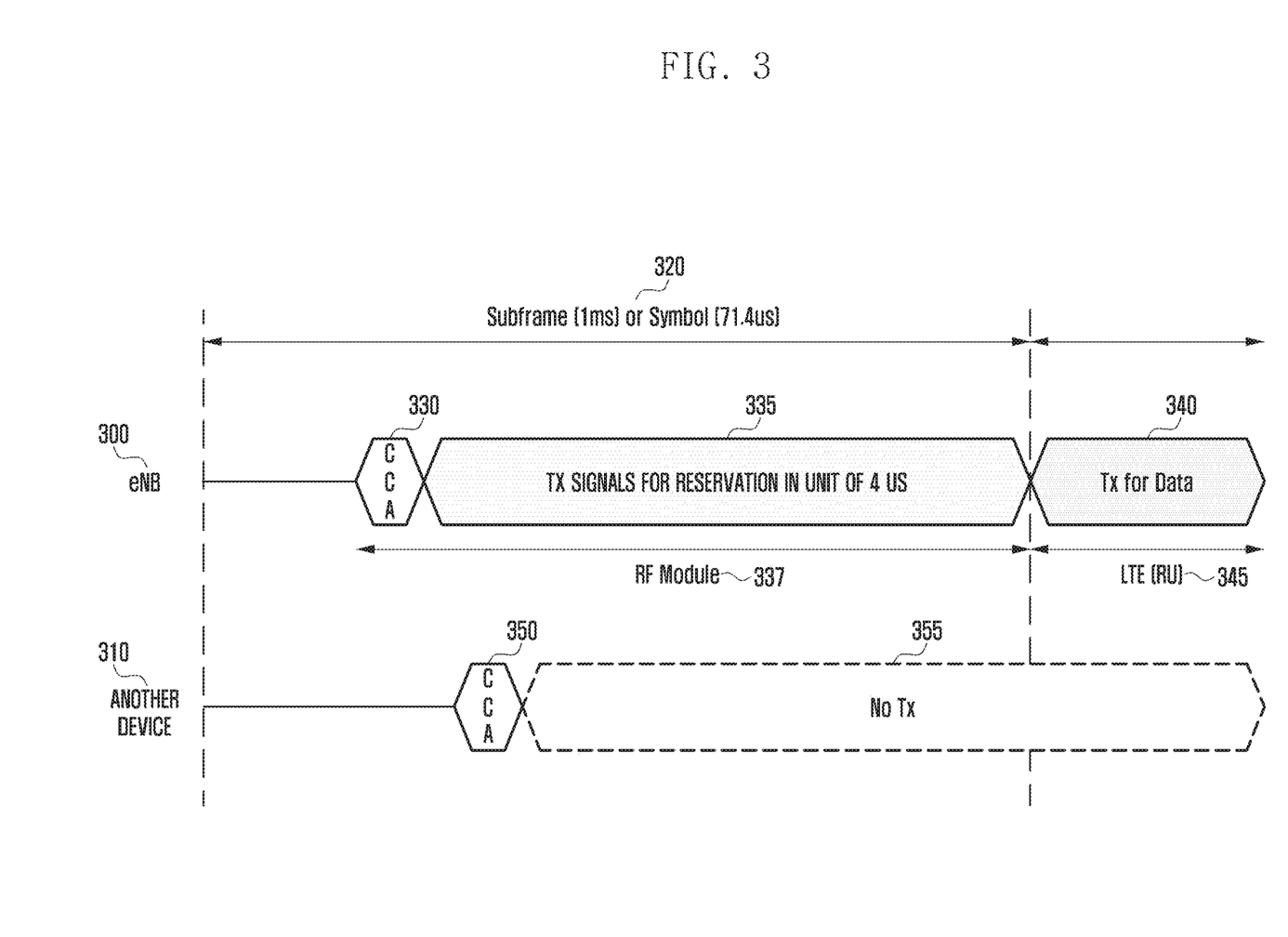
FIG. 3 is a diagram illustrating a channel reservation signal transmission method of an eNB for data transmission on an unlicensed frequency channel according to an embodiment of the present invention.

FIG. 3 is a diagram illustrating a channel reservation signal transmission method of an eNB for data transmission on an unlicensed frequency channel according to an embodiment of the present invention.

In detail, in the case where the eNB 300 shares the unlicensed frequency channel with a Wi-Fi access point (AP) 310 as another communication technology device, if the eNB 300 senses the idleness of the channel through CCA 330, it transmits a channel reservation signal periodically as denoted by reference number 335 before arrival of the next subframe or symbol for data transmission as denoted by reference number 340.

If the eNB 300 detects the necessity of data transmission on the unlicensed frequency channel, it performs channel sensing through CCA to determine whether a corresponding channel is idle. The CCA period 330 may be set to 20 us or more, 18 us, or 9 us depending on the type of LBT and radio communication technology. If it is determined as the CCA result that the channel is idle, the eNB 300 may transmit the channel reservation signal periodically until the next subframe or symbol for transmitting data arrives as denoted by reference number 335. If the channel reservation signal is a Wi-Fi signal, the eNB 300 may transmit the channel reservation signal on the unlicensed frequency channel at an interval of 4 µs by means of the RF module as denoted by reference number 337 because the Wi-Fi data symbol is 4 µs. Afterward, if the next subframe or symbol arrives, the eNB 300 may transmit data on the unlicensed frequency channel by means of the RU as denoted by reference number 345.

If the Wi-Fi AP 310 performs CCA as denoted by reference number 350 while the eNB 330 is transmitting the channel reservation signal, the Wi-Fi AP 130 may detect the channel reservation signal and determine that the channel is preoccupied by another device. In this case, the Wi-Fi AP 310 transmits no data and waits as denoted by reference number 355. That is, the eNB 300 may prevent the Wi-Fi AP 310 from occupying the unlicensed frequency channel before the time point when it can start data transmission by transmitting the channel reservation signal periodically before the arrival of the next subframe or symbol for transmitting data after CCA 330.

Figure 4:
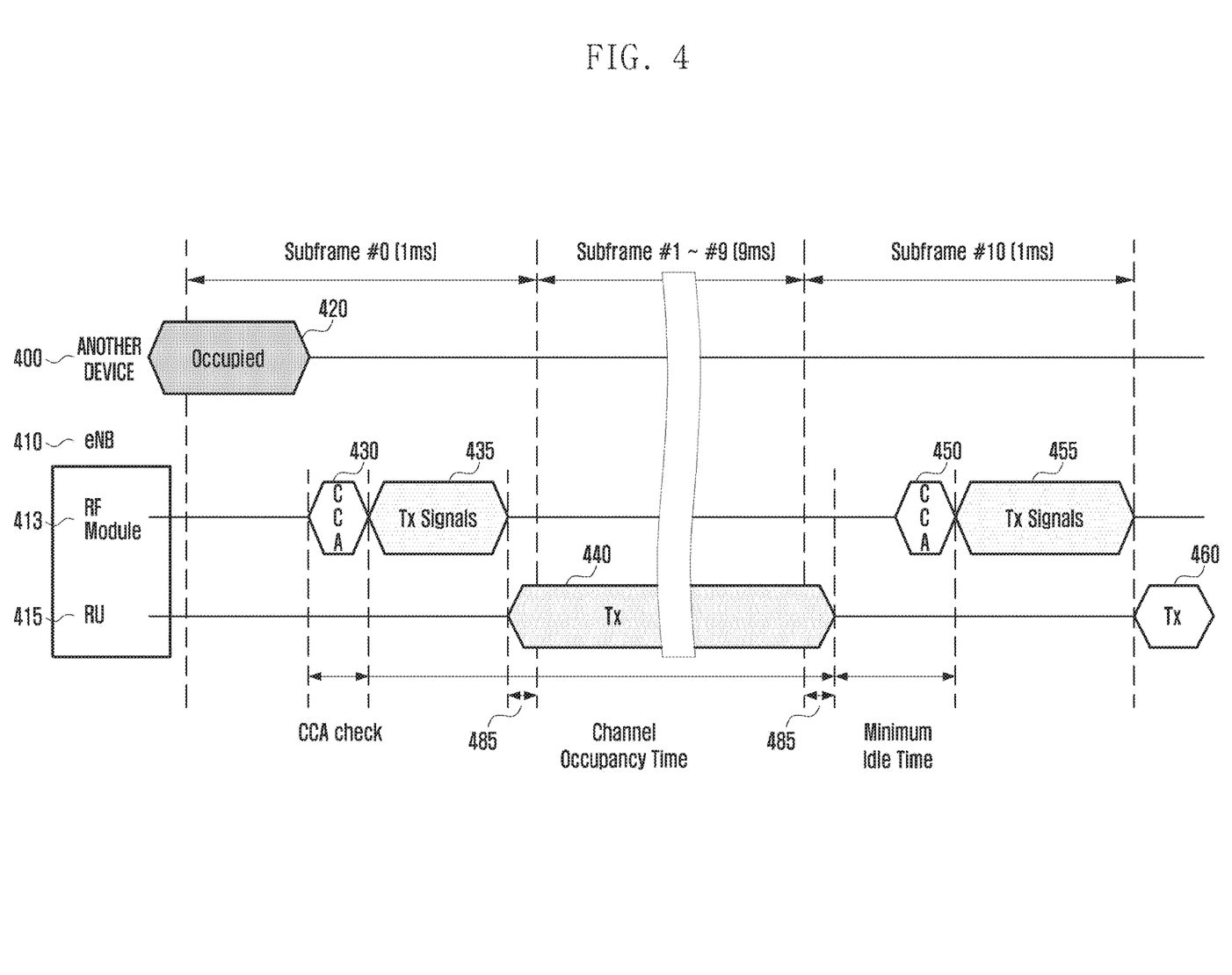
FIG. 4 is a diagram illustrating a channel reservation signal transmission method of an eNB for data transmission on an unlicensed frequency channel according to another embodiment of the present invention.
Figure 5:
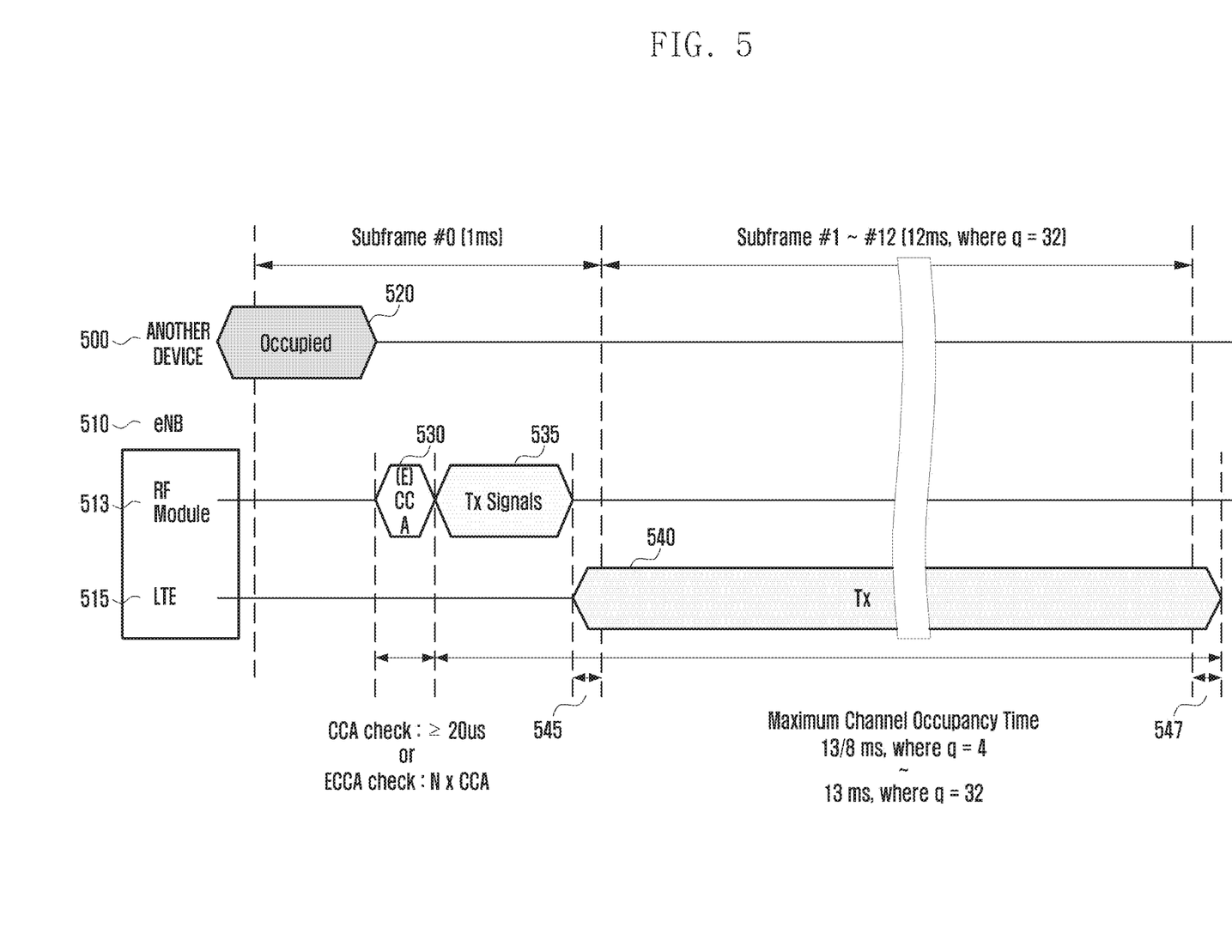
FIG. 5 is a diagram illustrating a channel reservation signal transmission method of an eNB for data transmission on an unlicensed frequency channel according to another embodiment of the present invention.
Figure 6:
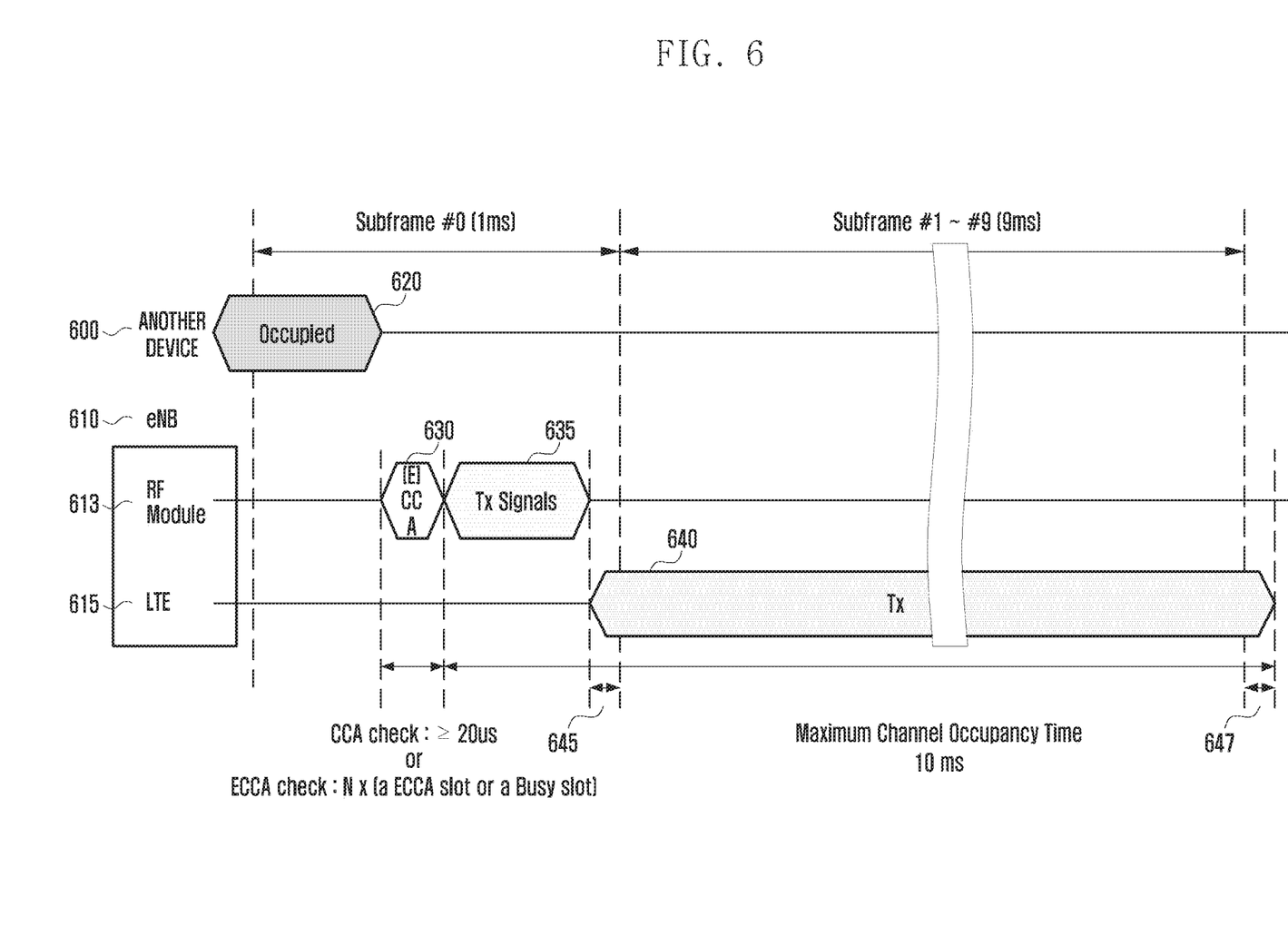
FIG. 6 is a diagram illustrating a channel reservation signal transmission method of an eNB for data transmission on an unlicensed frequency channel according to another embodiment of the present invention.

FIGS. 4 to 6 depict the methods for determining CCA, channel reservation signal transmission, and data transmission periods that are described with reference to FIG. 3 according to embodiments of the present invention. For convenience of explanation, CCA period is referred to as CCA check time, the sum of the channel reservation signal transmission time and data transmission time is referred to as channel occupancy time, and the period between the data transmission end time point and the signal transmission resuming time point is referred to as minimum idle time.

FIG. 4 is a diagram illustrating a channel reservation signal transmission method of an eNB for data transmission on an unlicensed frequency channel according to another embodiment of the present invention.

A description is made of the operation of an eNB with the CCA check time, channel occupancy time, and minimum idle time in compliance with the following conditions.

CCA check time≥20 µs 1 ms≤channel occupancy time≤10 ms minimum idle time=channel occupancy time×5%

After the ending of the channel occupancy time 420 of a Wi-Fi AP 400 as another communication technology device sharing an unlicensed frequency channel, an RF module 413 of an eNB 410 may perform CCA for channel sensing as denoted by reference number 430. In this case, the RF module 413 may perform CCA over 20 µs in compliance with the above condition. If the channel is assessed as idle (e.g., if the channel is not occupied by the Wi-Fi AP 400), the RF module 413 may transmit a channel reservation signal during a predetermined period as denoted by reference number 435, and then an RU 415 may transmit data to the terminal as denoted by reference number 440.

The RF module 413 of the eNB 410 may transmit the channel reservation signal in a period as denoted by reference number 435 before arrival of the next resource allocation period (e.g., subframe) after the end of the CCA 430. If it is assumed that the resource allocation period is a symbol, it may be possible to determine the data transmission time in consideration of the length of a symbol 485 and 487. In order to fulfil the condition of the channel occupancy time, the eNB 410 may determine the data transmission time 440 based on the channel reservation signal transmission time 435. That is, the eNB 410 may determine the data transmission time 440 by subtracting the channel reservation signal transmission time 435 from the channel occupancy time.

After transmitting data on the unlicensed frequency channel during the data transmission time 440, the RU 415 of the eNB 410 may stay in the minimum idle time as long as 5% of the channel occupancy time, and then the RF module 413 performs CCA as denoted by reference number 450 and transmits the channel reservation signal as denoted by reference number 455.

FIG. 5 is a diagram illustrating a channel reservation signal transmission method of an eNB for data transmission on an unlicensed frequency channel according to another embodiment of the present invention.

Similar to the embodiment of FIG. 4, a description is made of the operation of an eNB with the CCA (eCCA) check time and channel occupancy time in compliance with the following conditions.

CCA check time≥20 µs
1≤number of CCAs (N)≤q
channel occupancy time=(13/32)×q ms

In this embodiment, CCA is performed N times using extended CCA check. The number of CCA times N may be set to a value in the range between 1 and q, and q is determined, by an eNB manufacturer, in the range of 4 to 32.

After the ending of the channel occupancy time 520 of an Wi-Fi AP 500 as another communication technology device sharing the unlicensed frequency channel, an RF module 513 of the eNB 510 may perform CCA 530 for channel sensing. In this case, the RF module 513 may perform CCA N times over 20 µs in compliance with the above condition. If the channel is assessed as idle (e.g., if the channel is not occupied by the Wi-Fi AP 500), the RF module 513 may transmit a channel reservation signal 535 during a predetermined period.

The RF module 513 of the eNB 510 may transmit the channel reservation signal 535 before the arrival of the next resource allocation period (e.g., subframe) after the end of the CCA 530. If it is assumed that the resource allocation period is a symbol, it may be possible to determine the data transmission time in consideration of the length of a symbol 545 and 547. In order to fulfil the condition of the channel occupancy time, the eNB 510 may determine transmission time of the data 540 based on transmission time of the channel reservation signal 535. That is, the eNB 510 may determine transmission time of the data 540 by subtracting transmission time of the channel reservation signal 535 from the determined channel occupancy time. Afterward, if the next subframe or symbol as the next resource allocation period arrives, an RU 515 may transmit data 540.

FIG. 6 is a diagram illustrating a channel reservation signal transmission method of an eNB for data transmission on an unlicensed frequency channel according to another embodiment of the present invention.

Similar to the embodiment of FIG. 4, a description is made of the operation of an eNB with the CCA (ECCA) check time, and channel occupancy time in compliance with the following conditions.

CCA check time≥20 µs
ECCA slot time=18 µs
1≤number of ECCA slots (N)≤q
channel occupancy time=10 ms In this embodiment, ECCA is performed N times using extended CCA check. That is, an RF module 613 of the eNB 610 may observe to determine whether the unlicensed frequency channel is occupied by another communication technology device. Multiple ECCAs may have an observation period corresponding to multiple observation slots and may be referred to as ECCA (Extended CCA) check. Among the observation slots, a slot not in use by another communication technology device may be referred to as an unoccupied idle slot, and a slot in use by another communication technology device may be referred to as a busy slot. The number of ECCAs N may be set to a value in the range between 1 and q, and q is determined among 16 (initial value), 32, 64, 128, 256, 512, and 1024 in an ascending order whenever the eNB performs ECCA.

After the ending of the channel occupancy time 620 of the Wi-Fi AP 600 as another communication technology device sharing the unlicensed frequency channel, an RF module 613 of the eNB 610 may perform CCA 630 for channel sensing. In this case, the RF module 613 may perform CCA 630 N times over 20 µs or ECCA 630 of 18 µs N times in compliance with the above condition. If the channel is assessed as idle (e.g., if the channel is not occupied by the Wi-Fi AP 600), the RF module 613 may transmit a channel reservation signal 635 during a predetermined period. The RF module 613 of the eNB 610 may transmit the channel reservation signal 635 before the arrival of the next resource allocation period (e.g., subframe) after the end of the CCA 630. If it is assumed that the resource allocation period is a symbol, it may be possible to determine the data transmission time in consideration of the length of a symbol 645 and 647. In order to fulfil the condition of the channel occupancy time, the eNB 610 may determine transmission time of the data 640 based on transmission time of the channel reservation signal 635. That is, the eNB 610 may determine transmission time of the data 640 by subtracting transmission time of the channel reservation signal 635 from the determined channel occupancy time. Afterward, if the next subframe or symbol as the next resource allocation period arrives, an RU 615 may transmit data 640 during the allocated transmission time.

Figure 7:
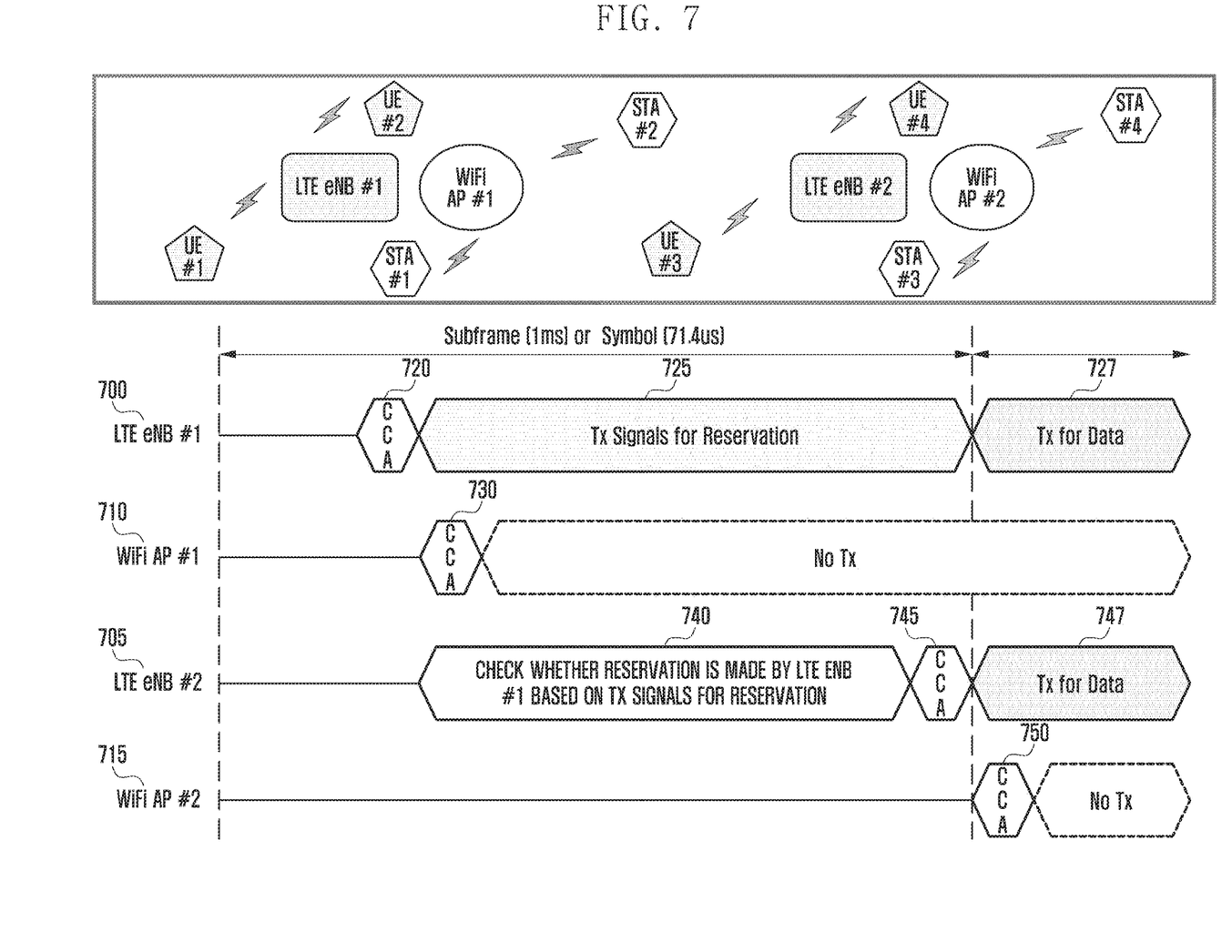
FIG. 7 is a diagram illustrating a data transmission method of an eNB using a channel reservation signal of a neighboring eNB according to an embodiment of the present invention.

FIG. 7 is a diagram illustrating a data transmission method of an eNB using a channel reservation signal of a neighboring eNB according to an embodiment of the present invention.

In detail, FIG. 7 depicts a data transmission method characterized in that, if an LTE eNB transmits a channel reservation signal and succeeds in channel reservation, a neighboring LTE eNB may perform data transmission simultaneously along with the LTE eNB during the data transmission time arriving after transmitting the channel reservation signal.

The description is made under the assumption of multiple eNBs 700 and 705 and other communication technology devices, e.g., Wi-Fi APs 710 and 715. If the LTE eNB #1 700 performs CCA 720 and senses idleness of an unlicensed frequency channel, it may transmit a channel reservation signal 725 before arrival of the next resource allocation period. In this situation, if the Wi-Fi AP 710 performs CCA 730 while the LTE eNB #1 700 is transmitting the channel reservation signal 725 periodically, it may sense the busyness of the channel and transmit no data.

Afterward, the LTE eNB #2 may determine, as denoted by reference number 740, whether the channel is reserved by the LTE eNB #1 700. In this case, the LTE eNB #2 705 may detect the channel reservation signal by means of its RF module and check the channel reservation signal for the identifier of the LTE eNB #1 700 to identify the LTE eNB #1 700 that transmits the channel reservation signal. The identifier of the LTE eNB #1 700 may include a basic service set identifier (BSSID) or a service set identifier (SSID). If the LTE eNB #2 705 identifies that the LTE eNB #1 700 and the LTE eNB #2 belong to the same operator based on the identifier of the LTE eNB #1 700, it may start transmitting data at the time point when the next resource allocation period of the LTE eNB #1 700 arrives as denoted by reference number 747 without transmitting its own channel reservation signal.

It may also be possible for the two eNBs 700 and 705 to exchange messages to share the information on the channel reservation of the LTE eNB #1 700 and, in this case, the two eNBs 700 and 705 may start transmitting data simultaneously at the time point of arrival of the next resource allocation period of the LTE eNB #1 as denoted by reference number 747. The message exchanged between two eNBs 700 and 705 may be an X2 interface message.

In this case, however, the LTE eNB #2 705 may perform CCA 745 additionally before the arrival of the next resource period to sense neighboring other communication technology devices that are not sensed by the LTE eNB #1. In this case, the Wi-Fi AP #2 715 may perform CCA 750 and sense the busyness of the channel during the data transmission of the LTE eNB #2 705 as denoted by reference number 747 and thus it may not transmit data.

Since the LTE communication system adopts an inter-eNB interference cancellation technology that makes it possible for UEs to receive the data transmitted by the two eNBs simultaneously without interference, the data transmission method of the present invention is advantageous in terms of improving unlicensed frequency channel utilization efficiency even between LTE eNBs. The inter-eNB interference cancellation technology may include AMC (adaptive modulation and coding).

Figure 8:
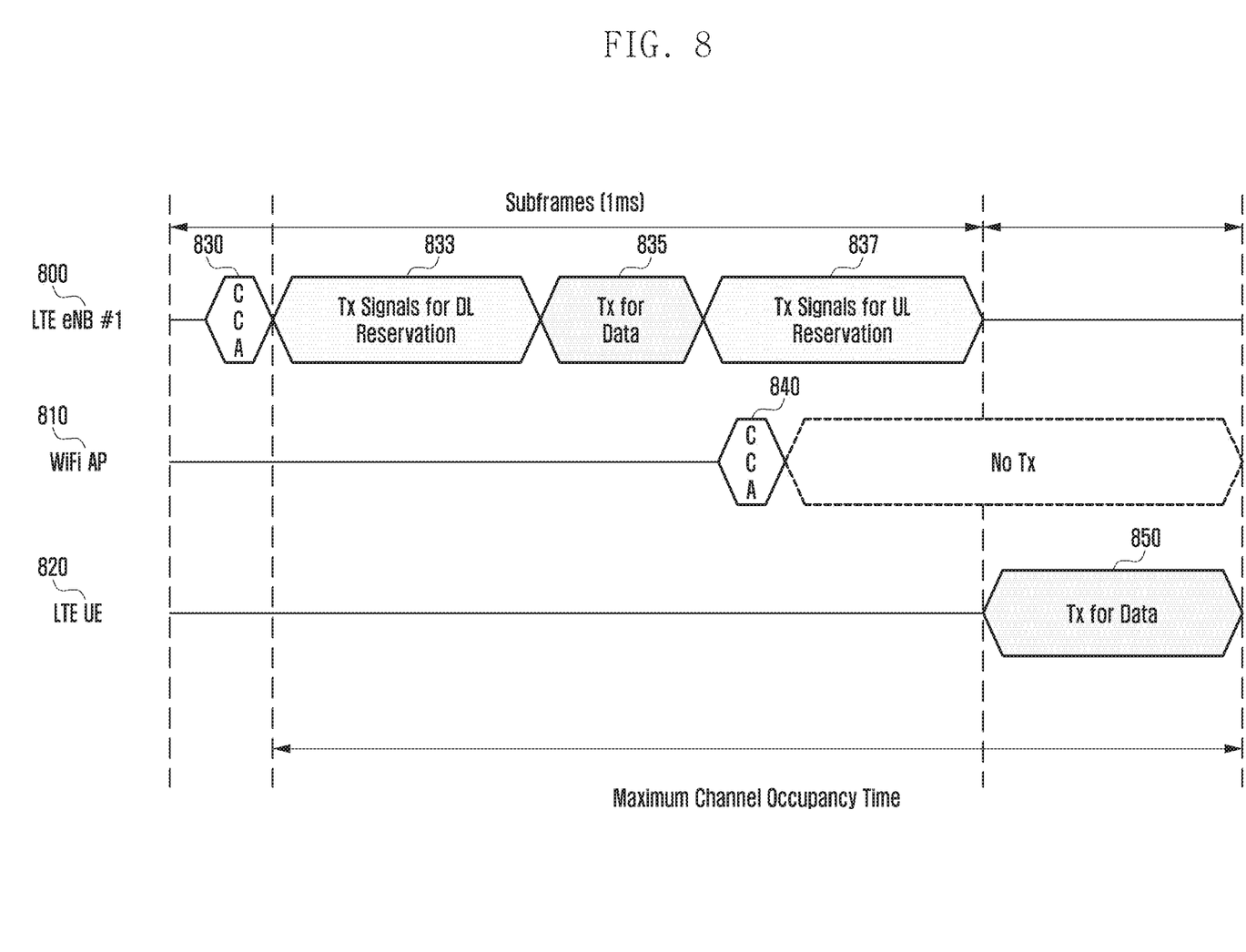
FIG. 8 is a diagram illustrating a channel reservation signal transmission method of an eNB for facilitating uplink signal transmission according to an embodiment of the present invention.

FIG. 8 is a diagram illustrating a channel reservation signal transmission method of an eNB for uplink signal transmission according to an embodiment of the present invention.

The above descriptions are directed to the channel reservation signal transmission methods for downlink data transmission from the eNB(s) to the UE(s). FIG. 8 depicts a channel reservation signal transmission method of the eNB for facilitating uplink transmission of a UE.

The eNB 800 may perform CCA 830 on an unlicensed frequency channel and, if the channel is sensed idle, transmit a channel reservation signal 833 periodically until the next resource allocation period arrives. Afterward, the eNB 800 transmits data 835 to the UE 820 and then the channel reservation signal 837 for occupying the unlicensed frequency channel for uplink transmission of the UE 820. While the eNB 800 is transmitting the channel reservation signal 837 for uplink transmission periodically, a Wi-Fi AP 810 as another communication technology device may perform CCA 840 and sense the busyness of the channel and thus it may not transmit data.

The UE 820 may transmit data 850 to the eNB 800 at an uplink transmission timing as scheduled by the eNB 800.

In this way, it may be possible to solve the problem caused by unlicensed frequency channel occupancy failure after the receipt of downlink data from the eNB, i.e., failure of transmission of a control signal such as acknowledgement (ACK) signal corresponding to the data received from the eNB.

Figure 9:
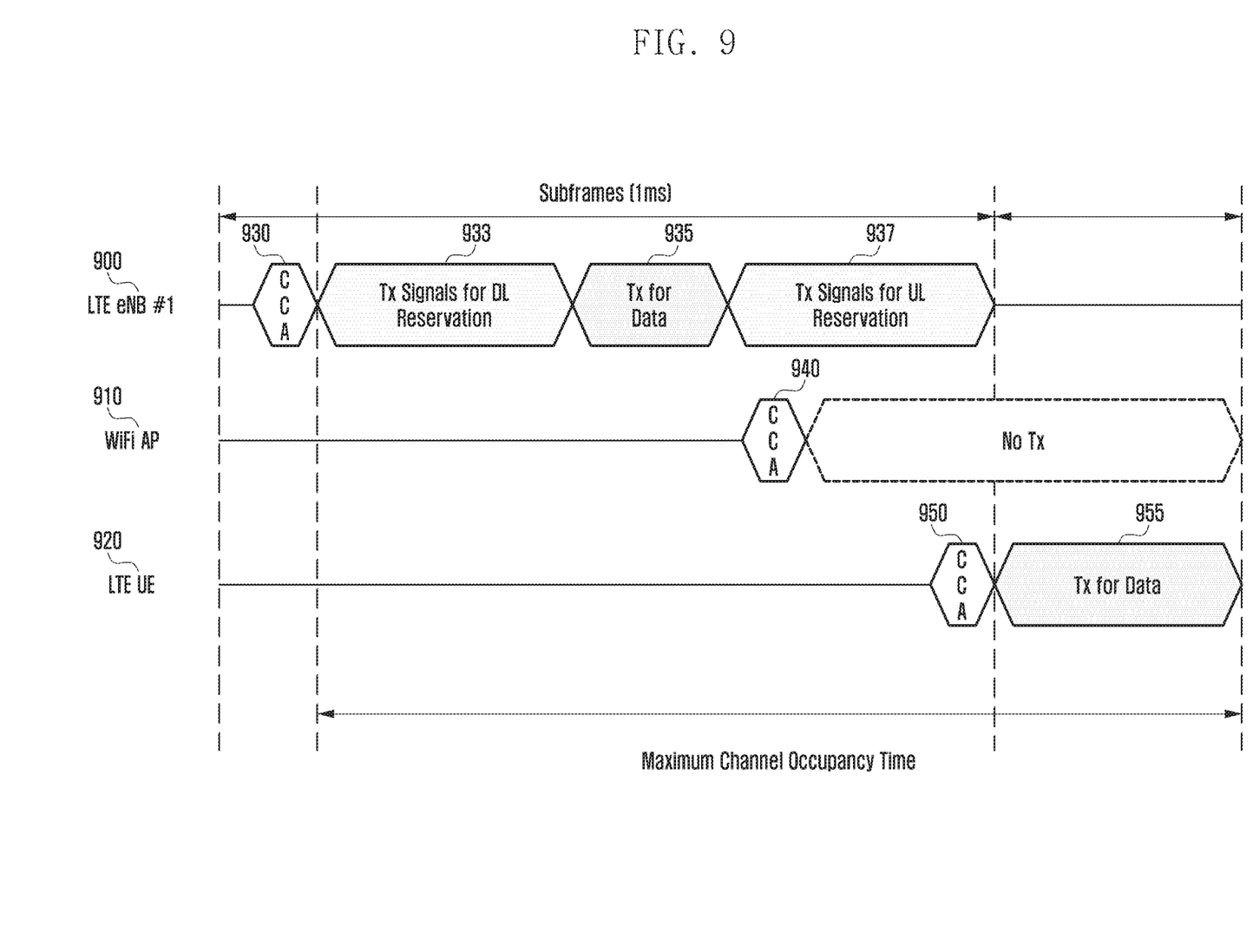
FIG. 9 is a diagram illustrating a channel reservation signal transmission method of an eNB for facilitating uplink signal transmission according to another embodiment of the present invention.

FIG. 9 is a diagram illustrating a channel reservation signal transmission method of an eNB for facilitating uplink signal transmission according to another embodiment of the present invention.

This embodiment is identical with that of FIG. 8 in that the eNB transmits a channel reservation signal for uplink transmission of a UE as described with reference to FIG. 8 with the exception that the UE performs CCA before transmitting uplink signals at a timing as scheduled by the eNB to further sense whether another communication technology device has preoccupied the unlicensed frequency channel.

The eNB 900 may perform CCA 930 on an unlicensed frequency channel and, if the channel is sensed idle, transmit a channel reservation signal 933 periodically until the next resource allocation period arrives. Afterward, the eNB 900 transmits data 935 to the UE 920 and then the channel reservation signal 937 for occupying the unlicensed frequency channel for uplink transmission of the UE 920. While the eNB 900 is transmitting the channel reservation signal 937 for uplink transmission periodically, a Wi-Fi AP 910 as another communication technology device may perform CCA 940 and sense the busyness of the channel and thus it may not transmit data.

Afterward, the UE 920 may transmit data 955 to the eNB 900 at an uplink transmission timing as scheduled by the eNB 900. However, the UE 920 may perform CCA 950 before the uplink transmission timing scheduled by the eNB 900 to determine whether the unlicensed frequency channel is occupied by another communication technology device. This is because the unlicensed frequency channel may be preoccupied by another communication technology device that is located around the UE 920 but is not detected by the eNB 900.

In this way, it may be possible to for the UE solve the problem caused by unlicensed frequency channel occupancy failure after the receipt of downlink data from the eNB, i.e., failure of transmission of a control signal such as acknowledgement (ACK) signal corresponding to the data received from the eNB.

Figure 10:
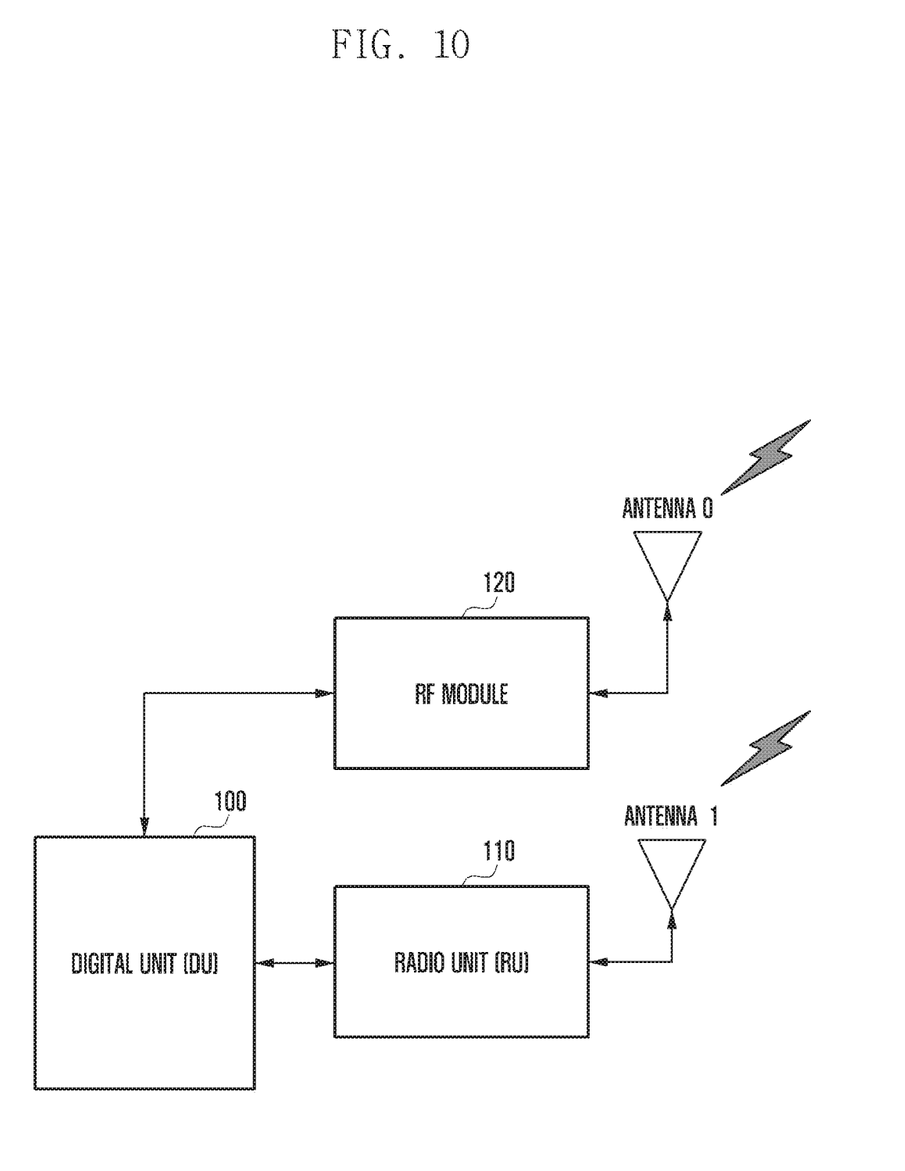
FIG. 10 is a block diagram illustrating a configuration of a base station according to an embodiment of the present invention.

FIG. 10 is a block diagram illustrating a configuration of a base station according to an embodiment of the present invention.

In reference to FIG. 10, the base station includes a first transceiver 1000, a second transceiver 1010, and a controller 1020.

The base station may transmit and receive signals by means of the first and second transceivers 1000 and 1010. The first transceiver 1000 may include a first Radio Unit (RU) for transmitting a signal in an LTE communication system, and the second transceiver 1010 may include an RF module for transmitting a signal in a non-LTE communication system, e.g., radio communication system operating on an unlicensed frequency such as a Wi-Fi system. The base station is included in the LTE communication system, the first transceiver 1000 may transmit a signal in unit of transmission time interval (TTI) as a scheduling (i.e., resource allocation period), i.e., subframe. The second transceiver 1010 may transmit the signal at a transmission interval of the non-LTE communication system. If the second transceiver 1010 includes an RF module for transmitting Wi-Fi signals, it may transmit the signal at the interval of 4 μs. Although the description is directed to the case where the first and second transceivers 1000 and 1010 transmit signals at respective intervals, it may also be possible to use a signal transceiver that is capable of transmitting signals at two different intervals.

Since the base station configured as above is capable of transmitting a signal on an unlicensed frequency channel at an interval different from the resource allocation period for data transmission on a licensed frequency channel, it may be possible for the base station to sense the idleness of the unlicensed frequency channel and transmit a signal on the unlicensed frequency channel before arrival of data transmission timing on the unlicensed frequency channel to prevent another communication technology device from preoccupying the unlicensed frequency channel.

The controller 1020 may control the operations of the base station according to an embodiment of the present invention.

The controller 1020 may determine whether a frequency channel is idle and, if so, transmit a first signal on the frequency channel before arrival of a data transmission timing and, upon arrival of the data transmission timing, transmit first data to the terminal. The first signal is transmitted periodically before the arrival of the data transmission timing. The arrival of the data transmission timing is a start of a resource allocation period arriving after sensing the idleness of the channel.

The first signal is transmitted before arrival of the data transmission timing at an interval shorter than the resource allocation period. The controller 1020 may control to transmit a second signal before a data transmission timing of the terminal and to receive second data transmitted by the terminal at the data transmission timing of the terminal.

The controller 1020 may detect a third signal transmitted by a neighboring base station on the frequency channel; check information of the neighboring base station; and transmit, when a data transmission timing arrives after detecting the third signal, third data to the terminal.

The controller 1020 may control to determine whether the frequency channel is occupied by another device before arrival of the data transmission timing and, if the frequency channel is not occupied by another device, transmit the third data. The information of the neighboring base station may be of an identifier of the neighboring base station included in the first signal or information included in a message being exchanged between the base stations. The identifier of the neighboring base station may be a BSSID or SSID, and the message exchanged between the base stations may be an X2 interface message.

The controller 1020 may control to sense the first signal transmitted by the neighboring base station on the frequency channel; check the information on the neighboring base station; and transmit, when the data transmission timing arrives after sensing the first signal, data to the terminal. The arrival of the data transmission timing is a start of a resource allocation period arriving after sensing the idleness of the channel. The first signal transmission interval may be shorter than the resource allocation period.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A data transmission method of a first base station in a wireless communication system, the method comprising:
   determining whether an unlicensed frequency band is available for data transmission during a current transmission time interval (TTI) of a corresponding radio communication technology by performing clear channel assessment (CCA); and
   upon determining that the unlicensed frequency band is available for data transmission:
      determining a start time for a next TTI, the next TTI being a TTI immediately following the current TTI,
      transmitting a first reservation signal for reserving the unlicensed frequency band for transmitting first data, the first reservation signal being transmitted in a unit of a length shorter than a length of a TTI during the current TTI and until the determined start time for the next TTI, and the first reservation signal being defined by a first radio communication technology, and
      transmitting the first data to a first terminal in the unlicensed frequency band during the next TTI and after the transmitting of the first reservation signal,
   wherein the first data is defined by a second radio communication technology different from the first radio communication technology,
   wherein, if the transmission of the first reservation signal is identified by a second base station, second data is transmitted to a second terminal in the next TTI, by the second base station, based on a predefined interference cancellation, and
   wherein the transmission of the first reservation signal is identified by the second base station based on at least one of a basic service set identifier (BSSID) included in the first reservation signal or a service set identifier (SSID) included in the first reservation signal.

2. The method of claim 1,
   wherein the current TTI corresponds to a first subframe,
   wherein the transmitting of the first reservation signal comprises transmitting the first reservation signal periodically before an end of the first subframe,
   wherein the next TTI corresponds to a second subframe after the first subframe, and
   wherein the first data is transmitted in the second subframe.

3. The method of claim 1, further comprising:
   transmitting a second reservation signal for reserving the unlicensed frequency band for uplink transmission of the first terminal after the transmitting of the first data; and
   receiving third data transmitted from the first terminal after the transmitting of the second reservation signal.

4. The method of claim 1,
   wherein, in the current TTI, the second base station determines whether another device uses the unlicensed frequency band, and
   wherein, if the second base station determines that the other device does not use the unlicensed frequency band, the second data is transmitted to the second terminal.

5. The method of claim 1, wherein the unit of a length shorter than the length of a TTI is 4 μs.

6. The method of claim 1, wherein if the unit of a length shorter than the length of a TTI is of a length of a symbol:
the transmitting of the first reservation signal comprises transmitting the first reservation signal periodically before a first symbol scheduled for transmitting the first data, and
the transmitting of the first data comprises transmitting the first data at the first symbol arriving after the periodic transmission of the first reservation signal.

7. The method of claim 1, wherein the first reservation signal is transmitted in a symbol where a channel sensing of the first base station has completed.

8. The method of claim 1, wherein the first reservation signal is a wireless fidelity (Wi-Fi) signal.

9. A first base station for transmitting data in a wireless communication system, the first base station comprising:
a transceiver configured to transmit and receive data; and
at least one processor configured to:
determine whether an unlicensed frequency band is available for data transmission during a current transmission time interval (TTI) of a corresponding radio communication technology by performing clear channel assessment (CCA), and
upon determining that the unlicensed frequency band is available for data transmission:
determine a start time for a next TTI, the next TTI being a TTI immediately following the current TTI,
control the transceiver to transmit a first reservation signal for reserving the unlicensed frequency band for transmitting first data, the first reservation signal being transmitted in a unit of a length shorter than a length of a TTI during the current TTI and until the determined start time for the next TTI, and the first reservation signal being defined by a first radio communication technology, and
control the transceiver to transmit the first data to a first terminal in the unlicensed frequency band during the next TTI and after the transmitting of the first reservation signal,
wherein the first data is defined by a second radio communication technology different from the first radio communication technology,
wherein, if the transmission of the first reservation signal is identified by a second base station, second data is transmitted to a second terminal in the next TTI, by the second base station, based on a predefined interference cancellation, and
wherein the transmission of the first reservation signal is identified by the second base station based on at least one of a basic service set identifier (BSSID) included in the first reservation signal or a service set identifier (SSID) included in the first reservation signal.

10. The first base station of claim 9,
wherein the current TTI corresponds to a first subframe,
wherein to transmit the first reservation signal comprises to transmit the first reservation signal periodically before an end of the first subframe,
wherein the next TTI corresponds to a second subframe after the first subframe, and
wherein to transmit the first data comprises to transmit the first data in the second subframe.

11. The first base station of claim 9, wherein the at least one processor is further configured to:
control the transceiver to transmit a second reservation signal for reserving the unlicensed frequency band for uplink transmission of the first terminal after the transmitting of the first data, and
control the transceiver to receive third data transmitted from the first terminal after the transmitting of the second reservation signal.

12. The first base station of claim 9, wherein, in the current TTI, the second base station determines whether another device uses the unlicensed frequency band, and
wherein, if the second base station determines that the other device does not use the unlicensed frequency band, the second data is transmitted to the second terminal.

13. The first base station of claim 9, wherein the at least one processor is further configured to control the transceiver to:
transmit, if the unit of a length shorter than the length of a TTI is of a length of a symbol, the first reservation signal periodically before a first symbol scheduled for transmitting the first data, and
transmit the first data at the first symbol arriving after the periodic transmission of the first reservation signal.

14. The first base station of claim 9, wherein the unit of a length shorter than the length of a TTI is 4 µs.

15. The first base station of claim 9, wherein the first reservation signal is transmitted in a symbol where a channel sensing of the first base station has completed.

16. The first base station of claim 9, wherein the first reservation signal is a wireless fidelity (Wi-Fi) signal.

* * * * *